United States Patent [19]

Hassall

[11] 4,157,966
[45] Jun. 12, 1979

[54] CENTRIFUGE EQUIPMENT

[75] Inventor: Anthony G. Hassall, Sandiway, England

[73] Assignee: Hunter Wire Products Limited, Warners Bay, Australia

[21] Appl. No.: 808,505

[22] Filed: Jun. 21, 1977

[51] Int. Cl.$^2$ ............................................. B01D 33/02
[52] U.S. Cl. ............................ 210/380 R; 210/497 R
[58] Field of Search ................. 210/360 R, 367, 362, 210/378, 380 R, 380 H, 381, 497 R, 369, 370, 372, 373, 374; 162/DIG. 1

[56] References Cited

U.S. PATENT DOCUMENTS

| | | | |
|---|---|---|---|
| 2,978,023 | 4/1961 | Helland | 162/DIG. 1 |
| 3,955,754 | 5/1976 | Schaper | 210/380 R |

*Primary Examiner*—Frank Sever
*Attorney, Agent, or Firm*—Ladas, Parry, Von Gehr, Goldsmith & Deschamps

[57] ABSTRACT

This invention relates to a centrifuge device comprising a housing extending continuously about an axis of rotation and having a flexibly resilient slitted liner attached to an inner wall portion to provide a wear surface.

6 Claims, 2 Drawing Figures

CENTRIFUGE EQUIPMENT

This invention relates to improvements in centrifuge equipment.

Centrifuge units for use in dewatering spicular, granular or particular materials comprise a cylindrical container mounted for rotation about the axis thereof. These containers may be conical in shape or cylindrical according to the requirements of the user.

Constructionally the containers comprise a plurality of vertical members disposed at generally equally spaced positions about a circumference in generally vertically aligned relationship to the axis of rotation of the container. These vertical members are connected by a plurality of annular members disposed at spaced intervals along the length of the container to provide a generally circumferential structure the internal surface of which is lined with elements to provide a generally mesh like construction.

In use the structure is mounted for rotation about its axis and charged with material which is to be centrifuged. Upon rotation of the structure at a predetermined speed the material is centrifugally forced against the internal lining of the centrifuge while liquid and very fine particles of the materials pass through the mesh like structure of the container so that the material within the container is centrifugally dried.

As a general rule the apertures of the mesh like structure of the centrifuge increase in dimension towards the base of the centrifuge thus, the lining of the centrifuge must comprise a plurality of elements.

Present known types of centrifuges of this type are operated under conditions in which the effective working life of the centrifuge container is extremely short. Generally the life of such a container under substantially continuous operating conditions is limited to about one or two months simply because the lining material is subjected to such abrasive action that it wears very rapidly to a point where the apertures become too large to allow economic operation.

It is therefore an object of this invention to provide a centrifuge container having internal lining means which is capable of withstanding operation for substantially longer periods of time than present known equipment.

In one general form the invention resides in a centrifuge device having an axis of rotation, means defining wall extending continuously about the axis of rotation, lining means disposed within said walls and extending about said axis of rotation, said lining means comprising at least one continuous length of flexible resilient material having suitable wear characteristics, said material having series of apertures means extending laterally therethrough, each of said aperture means comprising an elongate slit formed in said material and extending in the direction of said axis of rotation.

Notwithstanding any other forms that may fall within its scope the invention will hereinafter be described in two preferred forms together with modifications thereof by way of example only with reference to the accompanying drawings of which:

Figure 1:
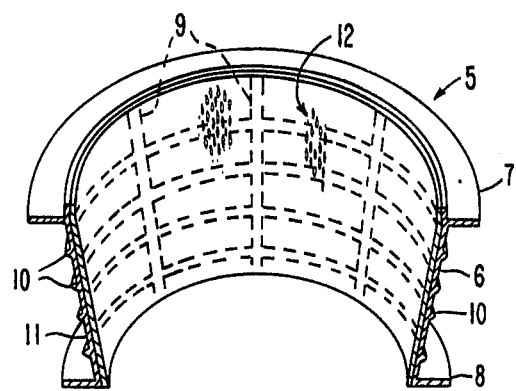
FIG. 1 is a cross sectional illustration of one type of centrifuge apparatus constructed in accordance with the invention.

Referring now to the drawings the present invention revolves around the problems associated with the improvement of the wear life of the internal wall of centrifuge containers. Because the life of the internal wall of a centrifuge container is relatively short it is desirable that the container be provided with a wear surface which is economical to produce and capable of substantially increasing the operational life of the container.

It is conceivable that a number of different materials could be utilized as a wear lining for such a purpose. Many of these materials however, would do no more than to increase the cost of the article to an extent where it will be doubtful that any substantial benefit could be obtained. There is however, an inherent advantage in utilizing a flexible resilient material having good elasticity characteristics. This advantage resides in the fact that such a material may be mounted on a wall within the container and provide the means whereby a single sheet of material treated in a particular manner will provide a meshed lining, the apertures of which vary in dimension from the top to the bottom of the container.

One such material found to be suitable for use in this invention is polyurethane sheet which may be produced in any thickness according to requirements. Once the sheet has been manufactured it may then be pierced with slitting tools to form a lattice work like arrangement which when stretched in the lateral direction of the slits will provide a series of apertures, the cross sectional dimension of which vary according to the degree of tension placed on the material.

The configuration of a centrifuge container of the type to which this invention relates may vary according to the requirements of the user. Accordingly, the invention will hereinafter be described in connection with a centrifuge basket comprising a conical element which is relatively short in the axial direction.

As illustrated in FIG. 1 this basket 5 comprises a wall 6, an upper flange 7 and a lower flange 8. The wall 6 is defined by a plurality of vertical elements represented by broken lines 9 (FIG. 1) connected at their upper and lower ends of flanges 7 and 8 respectively. A plurality of circumferential elements 10 arranged in axially spaced relationship to the flanges 7 and 8 and secured to the vertical members 9 complete the skeleton structure of the basket.

Mounted internally of the skeleton frame of the basket is a circumferential wall panel 11 which comprises an apertured sheet of material secured to the vertical and/or circumferential members 9 and 10 respectively. The dimensions of the apertures of this panel are not critical. It is however, desirable that they be at least equal to the dimensions of the apertures in the wear surface to be applied thereto.

Figure 2:
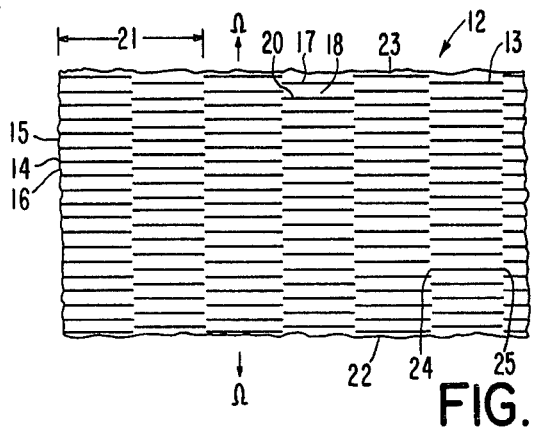
FIG. 2 is a representation of a lining material for use in the container of FIG. 1.

The wall panel 11 provides a surface onto which an elastic wear member 12 may be bonded. As shown in FIG. 2 the elastic wear member 12 comprises a sheet or plurality of sheets of urethane material having a plurality of slits 13 formed therein. The slits 13 are so arranged and disposed that they are aligned along parallel transversely spaced zones so that the slits along one zone 14 are staggered with respect to the slits in an adjacent zone 15 or 16. The slits must of course penetrate right through the material.

Figure 3:
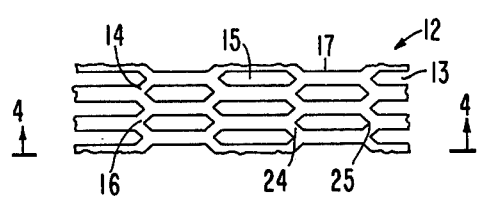
FIG. 3 is an illustration showing the general configuration of the material of FIG. 2 prior to mounting on a container of FIG. 1.

As shown in FIG. 3 when the material 12 is laterally stretched in direction Ω (FIG. 2) the slits 13 open transversely to provide the material with a lattice work like configuration, the webs 17 of the lattice being formed by the material 18 (FIG. 2) between each transversely aligned pair of slits 19 and 20 (FIG. 2).

It will of course be appreciated that the material 12 may be stretched to a greater degree in direction Ω at one or more points so that the slits 13 in any one zone such as for example zone 21 may have a greater transverse dimension than the slits in any other zone. Likewise by progressively increasing the tension in direction Ω along the length of a sheet the dimensions of the apertures 15' of the lattice work will progressively increase from one end of the sheet to the other. In this way the most efficient basket construction can be achieved.

There are a number of ways in which the lining 12 may be mounted on the internal wall 11 of the container. The most efficient and more economical way however would be to mount the wall 11 on the skeleton structure that it is readily removable. In this manner the wall panel 11 which may comprise a plurality of individual sheets of material may be cut to shape and positioned flatly on a fixture and coated with a suitable adhesive whereupon a suitably dimensioned sheet of wear material 12 may be positioned thereon with each slit 13 aligned with a corresponding aperture in the wall 11. By gripping the sheet 12 along opposite edges 22 and 23 respectively the sheet 12 may be transversely tensioned to open the slits 13 to the required lateral dimensions whereupon the sheet 12 is then compressively engaged with the wall panel 11.

Once the bond between the sheets 12 and the wall 11 is complete the sheets 12 is then peripherally cut to conform to the shape of the panel 11. It will of course be appreciated that if the bond is achieved between the flat sheets the resultant apertures 15 will relax to some extend to a smaller dimension as the compound sheet is curved to fit the interior of the basket skeleton. Accordingly this relaxation should be compensated for during the tensioning operation.

In an alternative method the assembly of the sheets 12 and the panel 11 may be accomplished with the aid of a former the wall of which corresponds dimensionally to the internal dimension of the completed basket. The sheets 12 may then be placed on the former with the slits disposed in the vertical direction and tensioned to open the slits to the required dimensions. At this stage, the adhesive is then applied to either the sheet 12, the panel 11 or both, the panel 11 then being placed on the sheet and adjusted so that the apertures correspond with the slits. The panel is then compressively engaged with the sheet 12 until the bond is completed whereupon the assembly may be trimmed and fitted to the basket skeleton.

Figure 4:
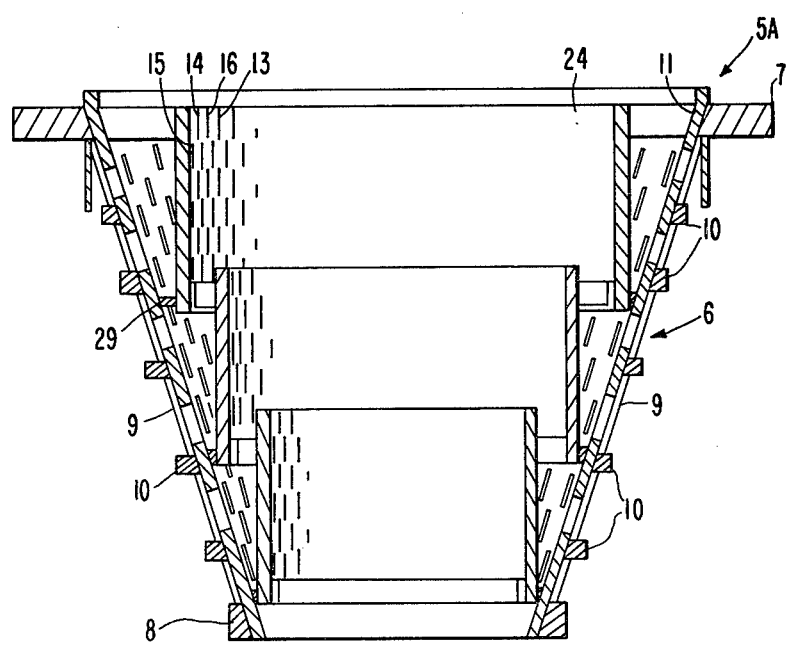
FIG. 4 is a cross sectional illustration of another form of the centrifuge apparatus according to the invention.

The basket 5A illustrated in FIG. 4 is constructed substantially the same as the basket 5 of FIG. 1. In this form of the invention however the internal lining of the basket takes a different form particularly the lining comprises three circumferential elements formed in the material hereinbefore specified. Each element 24, 25 and 26 is of a different size and is located in a different position within the basket.

Each of the elements 24, 25 and 26 comprise a length of material connected end to end to forming an angular carrier and is provided with a plurality of slits 13 as with the previous embodiment described herein extend in the direction of the axis of rotation of the basket. The first one 26 of these angular elements is positioned in the basket near the lower end thereof and secured to the wall of the basket about its lower most peripheral edge by a suitable fastening means so that it extends outwardly for some distance into the basket along the axis of rotation. The second element 25 of similar construction to element 26 but larger in the transverse direction is then mounted in the basket in overlapping relationship to the element 26 and likewise secured to the internal wall of the basket at its lower most peripheral edge so that the remaining portion thereof extends axially relative to the basket for some distance towards the opposite end. The third element which is substantially larger in diameter than elements 25 and 26 is then mounted in the basket in overlapping relationship to the element 25 and likewise secured to the wall. This element extends along the direction of the axis of rotation of the basket towards the larger end of the basket to determine immediately below the upper most extremity thereof.

The connections 29 between the lower most peripheral edges of the elements 24, 25 and 26 may be achieved by any suitable means, particularly the material may be placed in contacting relationship with the wall 6 with a metallic ring piece located therein and secured in sandwich like relationship between the metallic ring piece 30 and the wall 6.

In an alternative form the elements 24, 25 and 26 may be connected in sandwich like relationship between the metallic ring piece 30 and an outer ring piece 31. The complete assembly then being secured in the basket by bolts passed through apertures in the wall 6 into threaded holes formed of integers about circumference of the ring piece 31.

In use as the basket is rotated about its axis of rotation thus elements 24 will be urged outwardly towards wall 6. This centrifuge force will cause the material to stretch opening the slits 13 to allow material to pass therethrough. Because of the way in which the elements 24, 25 and 26 are mounted the centrifuge force acting on the elements will cause the slits 13 to open up by different degrees at different zones thus the slits in each element will during rotation of the basket have a different aperture size along axial length thereof. The slits being of progressively greater transverse dimensions at the top than at the bottom. Thus an efficient centrifuge basket may be constructed having wear characteristics substantially better than the wear characteristics of any present known centrifuge basket.

It will be appreciated by those skilled in the art from a consideration of the embodiments hereinbefore described that the invention provides a substantially more efficient centrifuge than as heretofore been available.

What I claim is:

1. A centrifuge device comprising a perforate basket container having an inlet, an outlet and a circumferential wall which converges towards the outlet, a urethane plastic liner in unitary sheet form having a vertical dimension which is initially shorter than the vertical dimension of said container and plurality of rows of transversely and longitudinally spaced slits formed therein and stretched transversely sufficiently to make the vertical dimension of said liner coincide with the vertical dimension of said basket and to open said slits to form elongate apertures extending in the direction of the axis of rotation of said device which register with apertures of said container, and means bonding the liner to said wall to provide a wear surface.

2. A centrifuge device for separating one material from another, comprising a cone-shaped basket having a perforate wall and adapted to be mounted for rotation about an axis extending along the axis of said basket; said basket having a continuous perforate wall extending about its inner peripheral surface; fastening means, disposed at a predetermined location along the axis of said basket, for mounting a perforate flexibly resilient unitary plastic sheet material having an initial vertical dimension shorter than the vertical dimension of said basket, internally of said perforate wall by distorting the vertical dimension of said material to coincide with the vertical dimension of said basket, to provide a wear surface having apertures which register with perforations of said wall against which said materials move during rotation of said basket.

3. In a centrifuge device, comprising a perforate basket, a slitted flexible resilient plastic unitary sheet material which in the vertical dimension is initially shorter than the vertical dimension of the basket, applied directly internally to said perforate basket distorting the vertical dimension of said lining to coincide with the vertical dimension of said basket so as to provide a removable lining with the openings in the lining registering with those in the basket.

4. A centrifuge device as claimed in claim 3, wherein the lining consists of slitted polyurethane sheet material.

5. A centrifuge device as claimed in claim 3, wherein the slitted plastic liner having been stretched to open the slits, is bonded to the inner surface of the perforate basket.

6. A centrifuge device as claimed in claim 3, wherein the slits are arranged in parallel transversely spaced zones so that the lining material when stretched assumes a lattice work configuration.

* * * * *